United States Patent
Kent

(10) Patent No.: US 10,419,856 B2
(45) Date of Patent: Sep. 17, 2019

(54) ELECTROACOUSTIC TRANSDUCER

(71) Applicant: BAE SYSTEMS plc, London (GB)

(72) Inventor: Lionel William John Kent, Chelmsford Essex (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 16/093,514

(22) PCT Filed: Mar. 28, 2017

(86) PCT No.: PCT/GB2017/050859
§ 371 (c)(1),
(2) Date: Oct. 12, 2018

(87) PCT Pub. No.: WO2017/178787
PCT Pub. Date: Oct. 19, 2017

(65) Prior Publication Data
US 2019/0215613 A1    Jul. 11, 2019

(30) Foreign Application Priority Data

Apr. 12, 2016  (EP) ..................................... 16275052
Apr. 12, 2016  (GB) .................................. 1606278.8

(51) Int. Cl.
*H04R 17/00*    (2006.01)
*H04R 3/00*    (2006.01)

(52) U.S. Cl.
CPC ............... *H04R 17/00* (2013.01); *H04R 3/00* (2013.01)

(58) Field of Classification Search
CPC ........... H04B 11/00; H01L 41/00; H04R 3/00; H04R 17/00
See application file for complete search history.

(56) References Cited

U.S. PATENT DOCUMENTS

| 3,510,698 | A | * | 5/1970 | Massa ..................... H04R 17/00 310/330 |
| 4,348,075 | A |   | 9/1982 | Gottlieb et al. |
| 4,443,729 | A |   | 4/1984 | Rider |
| 6,037,704 | A |   | 3/2000 | Welle |
| 9,070,394 | B1 |  | 6/2015 | Hahn et al. |

(Continued)

FOREIGN PATENT DOCUMENTS

| DE | 3313887 A1 | 10/1984 |
| DE | 4327687 A1 | 2/1995 |

(Continued)

OTHER PUBLICATIONS

International Search Report and Written Opinion received for PCT Application No. PCT/GB2017/050860, dated May 17, 2017. 14 pages.
GB Search Report under Section 17(5) received for GB Application No. 1606280.4, dated Jun. 2, 2016. 3 pages.
Extended European Search Report received for EP Application No. 16275053.3 dated Sep. 21, 2016. 8 pages.

(Continued)

*Primary Examiner* — Brian Ensey
(74) *Attorney, Agent, or Firm* — Finch & Maloney PLLC

(57) ABSTRACT

According to the present invention, there is provided an electroacoustic transducer, comprising: a first electrode; a second electrode; a piezoelectric material at least partially sandwiched between the first electrode and the second electrode; and a flexible electrical connector in electrical connection with the first or second electrode at discrete points around a periphery of that electrode, the discrete points being distributed about a substantial portion of that periphery.

20 Claims, 3 Drawing Sheets

(56) References Cited

U.S. PATENT DOCUMENTS

Figure 1:
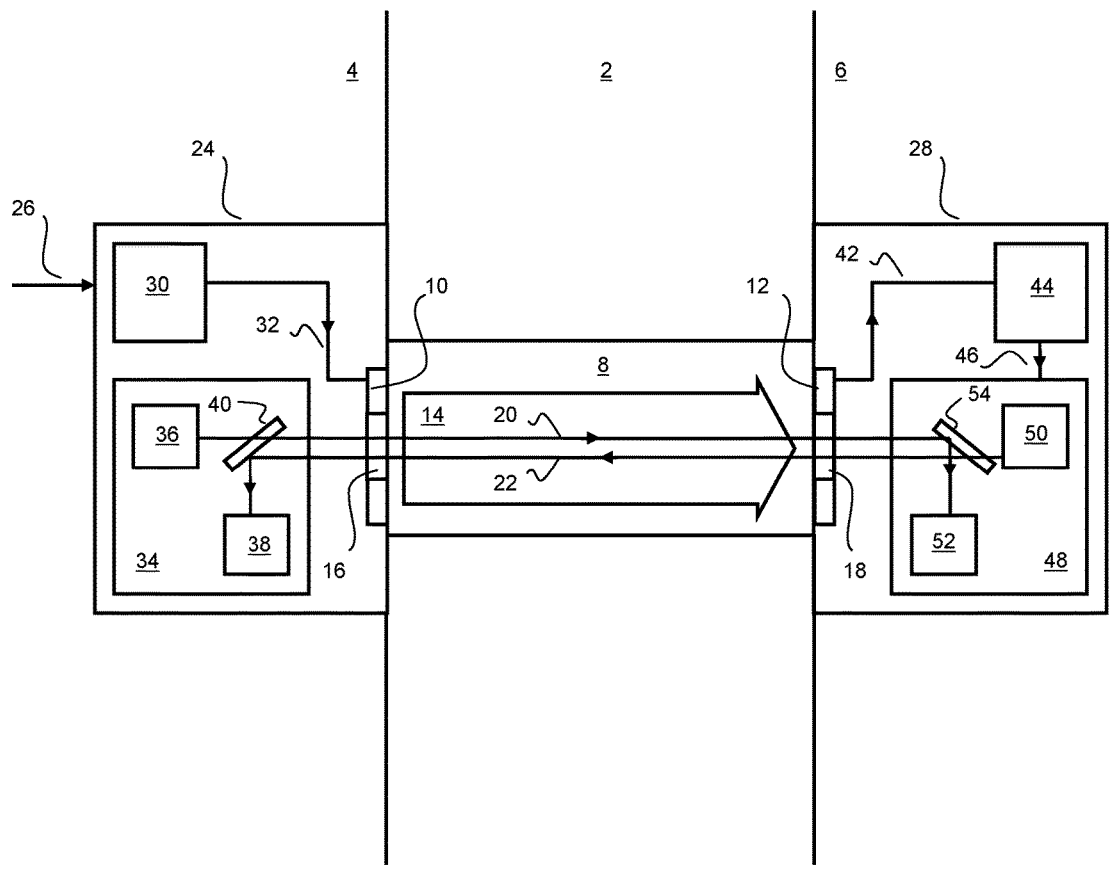

| | | | |
|---|---|---|---|
| 2006/0272418 A1 | 12/2006 | Mans et al. | |
| 2011/0025167 A1 | 2/2011 | Asano | |
| 2011/0203378 A1* | 8/2011 | Buccafusca | G01H 9/00 |
| | | | 73/655 |
| 2012/0127833 A1 | 5/2012 | Ghen et al. | |
| 2014/0269210 A1 | 9/2014 | Bagshaw et al. | |

FOREIGN PATENT DOCUMENTS

| | | |
|---|---|---|
| EP | 2293468 A1 | 3/2011 |
| EP | 2293469 A1 | 3/2011 |
| FR | 2730375 A1 | 8/1996 |
| GB | 2440844 A | 1/2011 |
| JP | S60244192 A | 12/1985 |
| WO | 2017/178787 A1 | 10/2017 |
| WO | 2017/178788 A1 | 10/2017 |

OTHER PUBLICATIONS

International Preliminary Report on Patentability received for PCT Application No. PCT/GB2017/050859, dated Oct. 25, 2018. 7 pages.
International Preliminary Report on Patentability received for PCT Application No. PCT/GB2017/050860, dated Oct. 25, 2018. 8 pages.
International Search Report and Written Opinion received for PCT Application No. PCT/GB2017/050859, dated Jun. 16, 2017. 12 pages.
GB Search Report under Section 17(5) received for GB Application No. 1606278.8, dated May 25, 2016. 4 pages.
Extended European Search Report received for EP Application No. 16275052.5, dated Aug. 24, 2016. 6 pages.

* cited by examiner

ELECTROACOUSTIC TRANSDUCER

The present invention relates generally to an electroacoustic transducer, and a power and/or data transceiver system comprising such a transducer, and a related method.

Electroacoustic transducers are often used for transmitting or receiving an acoustic signal. Such a transducer or a system comprising such a transducer may be used for example in a scanner, tomography system, or data or power transmission.

It is of course necessary to electrically connect an electroacoustic transducer to a controller which is used for processing, or similar, signals that are transmitted or received by the transducer. If the connection between the controller and the transducer is not given due consideration, then the connection itself can affect performance of the transducer.

As already briefly discussed above, electroacoustic transducers can be used to transmit or receive data via a generated or received acoustic signal. The transfer rate of data may be satisfactorily achieved using the typically high frequency acoustic signals generated or received by the transducer. However, a purely acoustic approach to data transmission or reception might not result in sufficiently high data transfer rates for certain applications.

It is an example aim of the example embodiments of the present invention to at least partially solve or avoid one or more problems or disadvantages with prior art transducers or related systems, whether identified herein or elsewhere, or to at least provide a viable alternative to existing transducers or related systems.

According to a first aspect of the present invention, there is provided an electroacoustic transducer, comprising: a first electrode; a second electrode; a piezoelectric material at least partially sandwiched between the first electrode and the second electrode; and a flexible electrical connector in electrical connection with the first or second electrode at discrete points around a periphery of that electrode, the discrete points being distributed about a substantial portion of that periphery.

The flexible electrical connector may have a stress relieving geometry at and/or between the discrete points.

The flexible electrical connector might generally extend around and is spaced apart from the electrode, except at the discrete points, where the flexible connector extends inwardly toward the electrode.

The flexible electrical connector might be shaped to have a spring-like, or planar spring-like, structure or geometry at and/or between the discrete points.

The flexible electrical connector might comprise one or more kinematic hinges.

The flexible connector might comprise a first portion that extends around a substantial portion of the periphery of the electrode. The flexible connector might comprise one or more second portions that meet and extend away from the first portion and arranged to facilitate the delivery of electrical power to/from the first portion. The first portion might have a smaller cross-sectional area, or might be thinner, or might be narrower, further from the meeting location or locations than it is at or more adjacent to the meeting location or locations.

The first or second electrode might at least partially wrap around the piezoelectric material, such that a portion of the second electrode and the first electrode are located on a same side of the piezoelectric material.

The electroacoustic transducer might further comprise an optical aperture extending through the electroacoustic transducer, to allow for optical communication to take place through the electroacoustic transducer.

According to a second aspect of the present invention, there is provided a power and/or data transceiver system, comprising a first electroacoustic transducer of the first aspect, wherein the electroacoustic transducer is utilized as a power transmitter, a data transmitter, a power receiver or a data receiver.

The first or second electrode of the first electroacoustic transducer might be bonded to a solid transmission medium, via which medium power and/or data can be transmitted and/or received by the first electroacoustic transducer.

A second electroacoustic transducer of the first aspect might also be provided. The first or second electrode of each of the first and second electroacoustic transducers might be bonded to substantially opposite ends or sides of the solid transmission medium, to allow for acoustic power and/or data transmission between the first and second electroacoustic transducers via the solid transmission medium.

The power and/or data transceiver system might comprise first and second electroacoustic controllers associated with, respectively, the first and second electroacoustic transducers, for: controlling the first or second electroacoustic transducer to generate an acoustic signal, for transmitting power and/or data to the second or first electroacoustic transducer, via the solid transmission medium, using that signal; and/or receiving power and/or data from the first or second electroacoustic transducer as a result of the first or second electroacoustic transducer receiving that signal.

The power and/or data transceiver system might comprise first and second optical controllers associated with, respectively, the first and second electroacoustic transducers, for optically transmitting/receiving data between the first and second optical controllers, the transmission/reception being through the solid transmission medium which is also substantially transparent to the transmission of optical signals, and through an or the optical aperture extending through each of the first and second electroacoustic transducers.

The solid transmission medium might extend through a barrier, from one side to another. The barrier might be an electrical insulator and/or be optically opaque.

According to a third aspect of the present invention, there is provided a method of transmitting or receiving data and/or power using an electroacoustic transducer, the method comprising generating or receiving an acoustic signal using the transducer, in order to transmit or receive data and/or power using that acoustic signal, wherein the transducer comprises a flexible electrical connector in electrical connection with an electrode of the transducer, around a substantial portion of a periphery of that electrode, wherein the flexible electrical connector is in electrical connection with the electrode at discrete points around a substantial portion of the periphery of that electrode.

According to a fourth aspect of the present invention, there is provided an electroacoustic transducer, comprising: a first electrode; a second electrode; a piezoelectric material at least partially sandwiched between the first electrode and the second electrode; and an optical aperture extending through the electroacoustic transducer, to allow for optical communication to take place through the electroacoustic transducer.

Each of the first electrode, second electrode and piezoelectric material might extend substantially around the optical aperture.

One or more of the first electrode, second electrode and piezoelectric material extend substantially around the optical aperture in a substantially circular, annular, arc, or c-shaped manner.

The optical aperture might extend through a centre of the transducer.

The optical aperture might extend through the transducer, offset from a centre of the transducer.

The first or second electrode might at least partially wrap around the piezoelectric material, such that a portion of the second electrode and the first electrode are located on a same side of the piezoelectric material.

The electroacoustic transducer might comprise a flexible electrical connector in electrical connection with the first or second electrode around a substantial portion of a periphery of that electrode. The electroacoustic transducer might comprise a flexible electrical connector in electrical connection with the first or second electrode at discrete points around a periphery of that electrode, the discrete points being distributed about a substantial portion of that periphery According to a fifth aspect of the present invention, there is provided a power and/or data transceiver system, comprising a first electroacoustic transducer of the fourth aspect, wherein the electroacoustic transducer is utilized as a power transmitter, a data transmitter, a power receiver or a data receiver.

The first or second electrode of the first electroacoustic transducer might be bonded to a solid transmission medium, via which medium power and/or data can be transmitted and/or received by the first electroacoustic transducer.

A second electroacoustic transducer of the first aspect might also be provided. The first or second electrode of each of the first and second electroacoustic transducers might be bonded to substantially opposite ends or sides of the solid transmission medium, to allow for acoustic power and/or data transmission between the first and second electroacoustic transducers via the solid transmission medium.

The power and/or data transceiver system might comprise first and second electroacoustic controllers associated with, respectively, the first and second electroacoustic transducers, for: controlling the first or second electroacoustic transducer to generate an acoustic signal, for transmitting power and/or data to the second or first electroacoustic transducer, via the solid transmission medium, using that signal; and/or receiving power and/or data from the first or second electroacoustic transducer as a result of the first or second electroacoustic transducer receiving that signal.

The power and/or data transceiver system might comprise first and second optical controllers associated with, respectively, the first and second electroacoustic transducers, for optically transmitting/receiving data between the first and second optical controllers, the transmission/reception being through the solid transmission medium which is also substantially transparent to the transmission of optical signals, and through an or the optical aperture extending through each of the first and second electroacoustic transducers.

The first and second optical controllers might be arranged to transmit data using different optical wavelengths.

The solid transmission medium might extend through a barrier, from one side to another. The barrier might be an electrical insulator and/or be optically opaque.

According to a sixth aspect of the present invention, there is provided a method of transmitting or receiving data and/or power via an electroacoustic transducer, the method comprising: generating or receiving an acoustic signal using the transducer, in order to transmit or receive data and/or power using that acoustic signal, and transmitting or receiving an optical signal through an optical aperture extending through the transducer.

It will be appreciated by the skilled person, from a reading of the disclosure in combination with the inherent knowledge of that skilled person, that one or more features described in relation to any one aspect of the present invention may be combined with and/or replaced with one or more features of other aspects of the described invention, and as such combination and/or replacement would be understood by that skilled person to be mutually exclusive. For instances, any one or more features described in relation to the transducer having a flexible electrical connector might be used in combination with an/or replace any one of the features of the transducer having the concept of an optical aperture, and so on.

Figure 2:
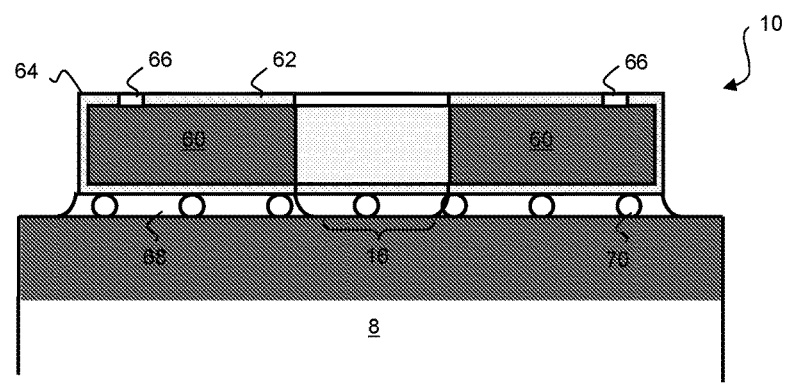
Figure 3:
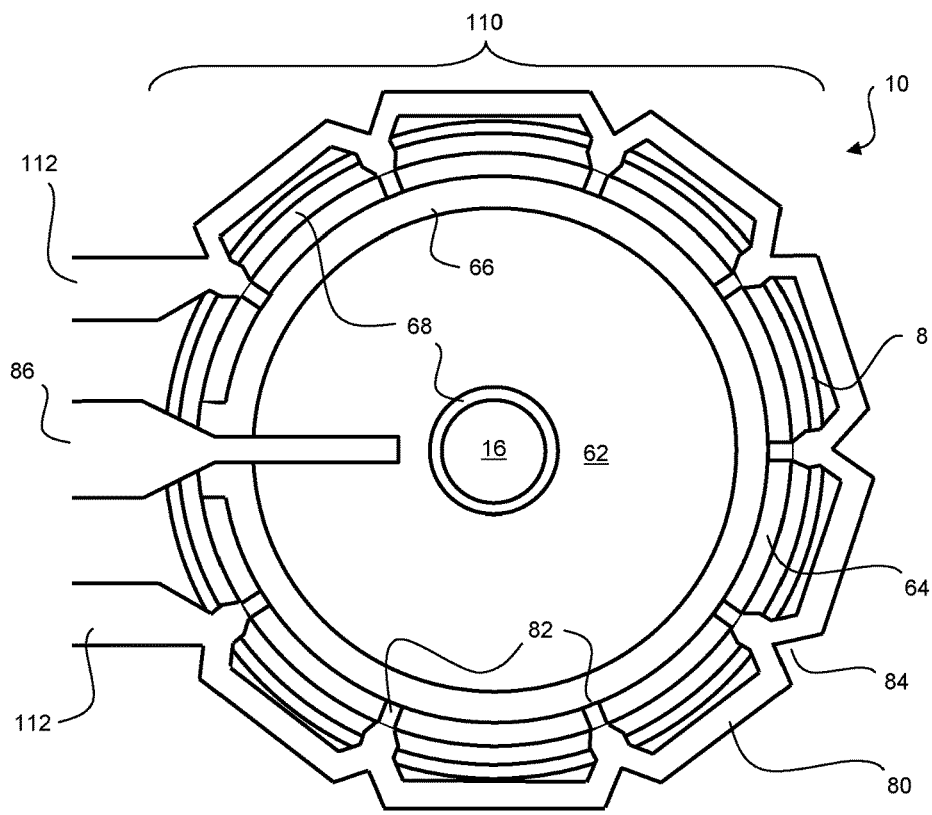
Figure 4:
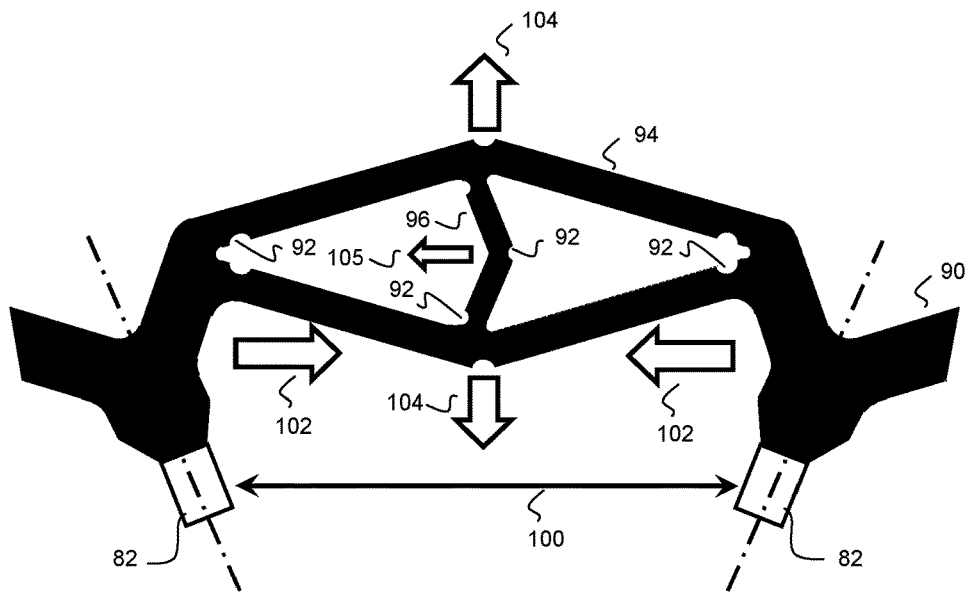
Figure 5:
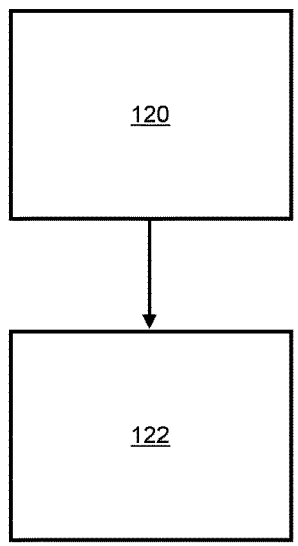
Figure 6:
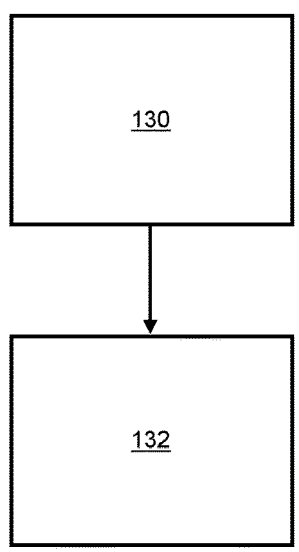

For a better understanding of the invention, and to show how embodiments of the same may be carried into effect, reference will now be made, by way of example, to the accompanying diagrammatic Figures in which:

FIG. 1 schematically depicts a power and/or data transceiver system, according to an example embodiment;

FIG. 2 schematically depicts an electroacoustic transducer, according to an example embodiment;

FIG. 3 schematically depicts further features of an electroacoustic transducer, according to an example embodiment;

FIG. 4 schematically depicts further detail of the example embodiment of FIG. 3;

FIG. 5 schematically depicts a method of using an electroacoustic transducer, according to an example embodiment; and FIG. 6 schematically depicts another method of using a different electroacoustic transducer, according to example embodiment.

Typically, an electrical connector to an electrode of an electroacoustic transducer extends towards and into contact with a single point of that electrode, for example in the form of a wire extending to a contact point or similar. This might be satisfactory in certain applications, for example in terms of the electrical connection and resulting performance of the transducer. However, according to an example embodiment, a more sophisticated and more robust construction relies on the electrical connector being flexible, and extending around a substantial portion of a periphery of the electrode, and coming into contact with that electrode at discrete points around that periphery. In brief, this might allow for better performance of the transducer, or performance in real terms more like that expected from the transducer.

It has already been described how data transfer rates using only acoustic signals might be satisfactory in some applications, but not sufficient in others. An existing approach to solving this problem might be to use optical data transmission. However, optical data transmission might not be possible through some mediums or barriers. At the same time, a degree of acoustic signal transmission might be desirable or necessary, for a second communication channel, for redundancy, or other purposes, such as transmission of power across a medium or barrier. In the past, optical and acoustic transceiver systems have been proposed, which rely on a side-by-side optical communication system and electroacoustic transceiver system. While this approach might solve some of the problems discussed above, such a side-by-side system results in quite an increased footprint compared with each component in isolation. An increased footprint is not desirable in many applications, where the applications require physical penetration of an object through a barrier in order for the system to be installed. A bigger footprint might mean a more substantial hole in the barrier, which could compromise the barrier. According to an example embodiment of the present invention, these problems may be largely overcome or avoided by providing an optical aperture which actually extends through the electroacoustic transducer. This allows optical communication to be undertaken through that transducer, while allowing the transducer to perform power/data transmission or reception in an acoustic manner. At the same time, this approach keeps the overall footprint of the apparatus smaller than if the individual components were implemented in a side-by-side manner.

These inventive principles will now be described in more detail in practical examples, with reference to FIGS. 1 to 6.

FIG. 1 schematically depicts a barrier 2. The barrier could take one of a large number of different forms, ranging from a wall of a building, or skin or hull of a vehicle or a ship, through to the wall of a nuclear reactor or other environment that requires separation from another space. A common theme of all such barriers is that it is, in general, not desirable to make unnecessary penetrations of the barrier, for example from one side 4 of the barrier 2 to another side 6 of the barrier 2. This might be to prevent general damage or reduction of structural integrity of the barrier 2, and/or to ensure that the environments on one side 4 of the barrier 2 are kept quite separate from the environment on the second side 6 of the barrier 2. In a more particular example, it could well be that one side of the barrier 4 contains a safe or controlled zone, whereas the other side 6 is a more remote or uncontrolled zone. So, the control zone 4 might comprise for example an inside of a ship or vehicle, or a control room, whereas the other side 6 might comprise an uncontrolled zone in the form of an external environment to the ship or vehicle, or a hazardous environment adjacent to the control room.

Of course, in some applications it may not be necessary to compromise the barrier 2 in any way at all, for example if purely acoustic data or power transmission is to be undertaken across the barrier. This is because acoustic signals may be transmitted quite readily by the barrier 2. However, in some instances, as already discussed above, acoustic signal transmission may not be sufficient for the application needs. Then, there might be a need to penetrate the barrier 2 in some way to provide a link for optical communications, for example by one or more cables or similar. Cables or similar may, however, be difficult to sufficiently seal with respect to the barrier, and/or may not be robust enough to maintain the structural integrity of the barrier as a whole. Also, the use of cables or similar may make it very difficult, if not impossible, to send data/power across the barrier using acoustic signals, which might be useful in certain circumstances.

In addition to the above-mentioned issues, it simply might not be possible to ensure that the barrier 2 is transmissive with respect to optical communications. Regardless, there might also be a need to transfer power across the barrier which might be difficult if the barrier is not electrically conductive, and a direct wired connection is not feasible or permitted.

It will therefore be appreciated that for one or more of the above reasons, it is not straightforward to design and implement a power and data transceiver system which communicates (i.e. can transmit data/power) across a barrier.

In accordance with an example embodiment, the barrier 2 is penetrated by a specifically chosen solid transmission medium 8. In this particular example, the solid transmission medium 8 is optically transparent to the optical communication scheme used, but at the same time, being solid in nature, can support the transmission of acoustic signals. As will be discussed in more detail below, this means that both optical and acoustic signal transmission can occur across the barrier 2, but because the transmission medium 8 is solid, the barrier 2 is at least not compromised to the extent that would be the case if one or more cables were to extend through the barrier 2 (i.e. instead of a solid medium 8).

Typically, the solid transmission medium 8 will be unitary in form, formed from a single piece of material or even a single crystal. Fused silica or quartz, for example in rod form, might be a good compromise of optical and acoustic transmission properties and cost, but other mediums might be used, for instance a sapphire crystal, particularly a C-axis orientated rod, or similar.

It can be seen that the solid transmission medium 8 extends from one side to the barrier 2 to the other side 6 of the barrier 2, as already discussed briefly above. Located at one side 4 of the barrier 2 and in contact with a first end of the transmission medium 8 is a first electroacoustic transducer 10. At an opposite end of the transmission medium 8 is located a second, similar or identical transducer 12. Each transducer 10, 12 may be controlled to transmit/receive acoustic signals 14 via the transmission medium 8, and the signals can be used for data and/or power transmission/reception, as is known in the art.

Importantly, each transducer 10, 12 is provided with an optical aperture 16, 18. The optical aperture 16, 18 extends through the respective transducer 10, 12, to allow for optical communication 20, 22 to take place through or via the respective transducer 10, 12, and thus for optical communication 20, 22 to take place from one side 4, 6 of the barrier 2 to the other side 6, 4 of the barrier 2.

By locating the optical aperture 16, 18 within the footprint of the transducer 10, 12, the overall footprint and installation complexity might be reduced in comparison with locating an optical element adjacent to a transducer (i.e. in a side-by-side relation). In terms of footprint, only a relatively small increase in the diameter or cross-sectional size of the transducer might be needed to account for the area 'lost' to the optical aperture. At the same time, locating the aperture within the transducer might avoid any excessive footprint that might otherwise occur due to the housings of the transducer or optical aperture, if the aperture and transducer were located side-by-side. Installation complexity might be reduced simply by the fact that only one component needs to be located at the end of, and bonded to, the transmission medium 8, as oppose to two. This might also reduce the number of components required, installation steps, maintenance, and replacements etc., and so on.

FIG. 1 shows that a generally defined first part 24 of an overall power and/or data transceiver system might be located on the first side 4 of the barrier 2. That first side 4 might be a more controlled environment where power 26 might be readily supplied to, and/or generated by, that first part 24 of the system. A second part 28 of the overall system is located on the second or other 6 side of the barrier 2, which might be located in an environment where the supply of power is not practical or even possible.

The first part 24 of the system comprises a first electroacoustic transducer controller 30 for controlling the signal 32 applied to the first transducer 10. First controller 30 will control the signal 32 applied to the transducer 10 to then transmit an acoustic signal 20 across the barrier 2, via the medium 8, to the second transducer 12. The signal might form or comprise data. However, such data transmission might not be desirable or required, since there is already the facility to provide optical communication, as will be discussed in more detail below. Thus, the controller 30 might control 32 the transducer 10 to transmit an acoustic signal 14 via the transmission medium 8, which is received by the transducer 12 and used to generate power on the second side 6 of the barrier 2. Thus, power might be transmitted across the barrier 2, without the use of a direct electrical connection across that barrier 2. The power might be used to power one or more components of the second part 28 of the overall system, as discussed in more detail below.

The first part 24 of the system also comprises a first optical controller 34, for optically communicating 20, 22 through the barrier. The first optical controller 34 might comprise an optical source 36, which might comprise, or be in connection with a data source similar. The optical source 36 might be chosen for the specific application, and more particularly for the desired data transfer 20 rate of that application. For instance, the optical source 36 might comprise one or more LEDs, which could support data transmission of up to around 300 Mbps. In more data intensive applications, the optical source 36 might comprise one or more laser diodes or lasers. A laser diode controlled using current modulation could support data transfer rates up to 1 Gbps. With the combination of a well-defined polarised laser or laser diode and a modulator external to the laser cavity, data transfer rates in the region of tens of Gbps could be supported.

The optical controller 34 also comprises an optical receiver 38 for receiving 22 optical signals at the first side 4 the barrier 2. The optical receiver 38 will, of course, be sensitive to the reception of optical signals transmitted from the other side 6 of the barrier. It might be convenient to ensure that data transmitted in one direction is undertaking using optical communications at a certain optical wavelength/frequency, and optical communication in the other direction is undertaken using a different wavelength/frequency, purely for ease of signal processing/differentiation. Alternatively, orthogonal optical polarisations for each optical signal 22, 24 could be used in conjunction with polarisation filtering.

The optical controller 34 might additionally comprise a beam splitter 40, or other optical modulator or manipulator which allows for transmitted and received optical signals to be handled and processed in a convenient manner, through/ via the single aperture 16 in the transducer 10. For instance, in FIG. 1, it is shown that the transmitted optical signal 20 generally passes through the beam splitter 40, whereas the received optical signal 22 is generally reflected by that beam splitter 40. Again, the use of different transmission/reception wavelengths/frequencies, or alternatively orthogonal optical polarisations, might assist in this optical handling, by the optical manipulator or modulator 40 being able to selectively transmit/reflect optical signals of certain wavelength/ frequencies, or alternatively orthogonal optical polarisations.

The transmission of power across the barrier 2 via medium 8 using an acoustic signal may take place in advance of, at the same time as, or possibly even after the transmission of data in an optical manner. Although the second part 28 of the overall system on the second side 6 of the barrier 2 might not be provided with power by any other means than the reception of an acoustic signal from the first transducer 10, the second part 28 might nevertheless (in some embodiments) have a temporary power store in the form of a battery or capacitor that might be able to receive and store power derived from a received acoustic signal 14. This amount of power might not be significant, but might nevertheless allow operation of one or more components of the second part 28 of the system without the part 28 receiving power from first transducer 10 at that precise moment in time.

A typical example operation of the system of FIG. 1 will now be described.

The first electroacoustic controller 30 will generate a signal 32, for example a high frequency signal 32, for driving of the transducer 10. In this example, the signal 32 will not comprise any meaningful data, but will simply be used to drive the transducer 10 in order to transmit an acoustic signal 14 through medium 8 to the second transducer 12, so that power can be derived via the second transducer. The second transducer 12 receives the acoustic signal 14 and converts the acoustic signal 14 into an electrical signal 42, which is passed onto a (second) controller 44 of the second acoustic transducer 12.

Power derived from reception and processing of the acoustic signal 14 may be used to drive 46 for instance, a second optical controller 48 of the second part 28 of the overall system. Although not shown, the controller 44 may be used to supply power to a sensor, actuator, or some other component located on the second side 6 of the barrier 2, and/or the second optical controller 48 which itself may be or comprise such a sensor, actuator, or other component.

The second optical controller 48 may comprise the same sort of optical source 50 and receiver 52 as already shown in and described with reference to the first part 24 of the system, located on the first side 4 the barrier 2. Of course, and as already described, the transmission/reception might operate at a different optical wavelength/frequency or alternatively orthogonal optical polarisation. Again, a beam splitter 54 or other like optical modulator 54 may also be incorporated within the optical controller 48, for the same reasons as already described above with the optical modulator 40 of the first part 24 of the system.

Data in optical form may be conveniently transmitted between the different sides 4, 6 of the barrier 2 via appropriate control of the transmitters 36, 50 and receivers 38, 52 of the different parts 24, 28 of the system located, respectively, on different sides 4, 6 of the barrier 2.

As might be expected, the data can take any convenient form as necessary to fulfill the requirements of the application in question. For instance, data may be transmitted from the first part 24 of the system to the second part 28 of the system in order to control, or for use by, a sensor or actuator or other component on that second side 28 of the system. Data may be transmitted in the other direction for the same or similar reasons or, alternatively and/or additionally, data might be representative or include information from sensors located on the second side 6 of the barrier 2.

The data transmitted between the different parts 24, 28 of the system might not necessarily relate to sensing, or actuating components or the like, of or associated with those parts 24, 28. For instance, the data that is transferred may be used to monitor power outputs or inputs with respect to the different transducers, sources, receiver, and related controllers, or data or power transmission. The data might be useful for optimising or monitoring the performance of the system as a whole. For instance, the data might be used to ensure that the acoustic signal that is used to power the second part 28 of the system is efficiently transmitted and/or received to maximise power transfer or again, by appropriate impedance matching or fine tuning of acoustic transmission properties, for example central frequency, amplitude and so on.

In a more specific example of optimisation using feedback, since the ends of the solid transmission medium 8 are parallel, acoustic transmission of power between the transducers 10 and 12 will be characterised by rapid variations of transmitted power with frequency due to acoustic interference effects. Information on the acoustic power delivered into second controller 44 could be feed back to the first controller 30 via data carried by the optical communication beam 22, and used as the basis of a feedback loop to optimise power delivery at the second controller 44.

FIG. 1 has shown the transmission of power 14 across the barrier 2 in one direction and the bi-directional optical transmission/reception 20, 22 of data across the barrier 2. The power is transmitted acoustically 14. There may be little or no need to transmit meaningful data across the barrier using an acoustic signal due to the presence of the optical communications link. However, uni-directional or bi-directional transmittal/reception of data in an acoustic manner can also be implemented using the arrangement of FIG. 1. Data could be transmitted as part of a transmission of power, in-between periods where power is transmitted, or instead of power transmission. Again, the use of a solid transmission medium that supports acoustic signal propagation allows for this example to be realised, if and when necessary. For instance, the acoustic transmission might be used as redundancy, for instance if the optical transmission fails permanently or temporarily. A slower data rate might be better than no data transfer at all.

As would be understood from the description of FIG. 1, the system allows for a part of a system located on one side or barrier to be powered by a part of a system on another opposite side of the barrier, in combination with high data transfer rates to take place. All of this is achieved without any, or at least significant compromise of the key properties (be they either electrical or mechanical, etc.) of the barrier 2 itself.

It will be noted that the detailed description of the transmission/reception of optical/acoustic signals has been omitted, since the invention does not relate to such application specific detail, but instead to the provision of an aperture in the transducer, and flexible connections as discussed below. The skilled person in the field will, with a reading of this disclosure, be able to implement optical/acoustic transmission/reception, from their own inherent knowledge in that field, and of neighbouring fields to which the invention might relate.

Similarly, controllers have been described quite generally, since their constructions are not pivotal to the understanding invention. In practical example, a controller could comprise more components, for example amplifiers, rectifiers, diodes, power monitors, etc., as would be understood by the skilled person.

FIG. 2 schematically depicts a cross-sectional view of the first transducer 10, and a part of the solid transmission medium 8 to which the transducer 10 is attached. Although not shown, the same principles that will be described will apply equally to the second transducer located at an opposite end of the solid transmission medium 8.

The transducer 10 comprises a piezoelectric material 60, which extends around the optical aperture 16. The piezoelectric material or layer 60 is substantially sandwiched between a first electrode 62 and a second electrode 64.

At least a part of the second electrode 64 partially wraps around the piezoelectric material 60 such that a portion of the second electrode 64 and the first electrode 62 are located at the same side of the piezoelectric material 60 and substantially in the same plane. This might allow for easier electrical connection for one or both of the electrodes 62, 64, for example to the controller described above. Without such wrapping around, it might be difficult to make good electrical connection to the second electrode 64, due to the need to bond that electrode to the medium 8, particularly if a non-electrical conducting bonding material is used between medium 8 and second electrode 64.

The first and second electrodes 62, 64 are electrically separated from one another by way of one or more isolator or insulator elements 66, which could be formed from an independent component, or an extension of the piezoelectric material 60 that is non/un-metallised.

The first transducer 10 is bonded to an end of the transmission medium 8 by bonding the second electrode 64 to the end of that medium 8. Before such bonding, the transmission medium 8 might be appropriately cleaned and polished. This might assist not only in the bonding process, but also in terms of the acoustic and/or optical coupling of signals into that medium 8 from or via the transducer 10.

The bond might comprise any suitable adhesive or bonding agent or similar 68. Spacers 70 might also be included, to maintain a consistent and/or desired spacing between the medium 8 and the transducer 10, again to optimise coupling of signals into the medium 8. Spacers might also prevent contamination in the bond/bonding process from non-uniformly positioning or loading the transducer 10, or the presence of smaller diameter foreign bodies that might otherwise result in a non-uniform bond thickness. Spacers 70 might take the form of rods, spheres, or similar.

The electrode or part thereof 64 which is bonded to the medium 8 is substantially planar in form, so as to assist in uniform bonding of the transducer 10 onto the medium 8, and thus uniform positioning/loading of the transducer 10. The opposing side of the transducer 10, which includes, substantially, the first electrode 62 and a part of the second electrode 64 will also, together, be planar in form. This ensures that loading pressure by a tool or similar might be more easily and uniformly applied to surfaces of those electrodes/parts 62, 64 to accurately and securely bond the transducer 10 to the medium 8 with a uniform bond thickness. Typically this tool will include a thin resilient pad on the surface to be placed directly against the transducer 10 or a surface thereof. This resilient pad is intended to deform around any high points on the transducer or any small diameter particles on the surface of the transducer. At the same time, this also helps ensure that uniform loading of the electrodes 62, 64, piezoelectric material 60 and transducer 10 in general, takes place, to ensure that final performance of the transducer 10 is not adversely affected by the bonding due to an uncontrolled bond layer thickness across its bonded surface.

The optical aperture 16 is shown. The optical aperture 16 extends through the first electrode 62, piezoelectric material 60 and second electrode 64. This might alternatively/or traditionally be described or defined as the one or more of the first electrode 62, piezoelectric material 60, and second electrode 64, as appropriate, extending around that optical aperture 16, in example in a circular-like or more specifically annular, c-shape, or arc-like manner. The diameter of this optical aperture will typically be smaller than the diameter of the hole in the piezoelectric layer 60 due to the formation of a fillet of the bond layer material that will build up on the side wall in the hole through the piezoelectric layer 60.

The optical aperture 16 could comprise one or more of: a space or gap; an optical element such as a lens; or a solid piece of optically transparent material such as fused silica or quartz. The choice might depend on the optical communications system that is implemented.

The optical aperture 16 is shown as being circular in cross-section. However, the aperture could be rectangular or square. Stress relieving fillets might be provided in more angular apertures, for example rectangular or square apertures.

In all Figures shown and described herein, the optical aperture 16 is shown as being located substantially at the centre of the respective transducer. In some examples, this might be advantageous, in terms of the overall manufacture and packaging of the transducer, but also in terms of aligning the optical aperture with respect to another across the barrier via the medium 8. However, locating the optical aperture off-centre might also have benefits. This is because there will be an impact on the transmission of the acoustic signal by the very presence of the optical aperture. So, locating the optical aperture off-centre might yield a superior reduction of acoustic energy being coupled into higher diffraction orders of the Airy circle diffraction side lobes; compared to the increase in the acoustic energy coupled into the higher diffraction orders when a circular obstruction is placed in front of an otherwise uniformly emitting circular aperture. That is, in other words, locating the optical aperture 16 off-centre might lead to a better or more efficient transmission of acoustic power across the barrier, and therefore a more efficient delivery of power to the system parts on the other side of the barrier.

Now that the transducer 10 has been described in more detail, another specific example of optimisation of the overall system using feedback across the barrier can be provided. Piezoelectric transducers made using Lead Zirconium Titanate (PZT) in particular have a relative dielectric constant that is a strong function of the environmental temperature that in turn affects the 'dead' capacitance of/across the piezoelectric layer 60 of the transducer 10. The dead capacitance of the transducer 10 is the capacitance of the transducer's electrodes at the operating frequency, in the absence of any piezoelectric induced modifications to the effective reactance of the transducer 10. As a consequence, the optimal operating frequency for the acoustic power transmission link will be a function of temperature, and so as part of any control loop for the exact operating frequency, the temperature of the two transducers in the system could be monitored so that the optimal frequency of operation is selected for the two not necessarily identical temperature transducers. Consequently as part of the electrical feedback loop regarding control of the operating frequency of the power link, the temperature of the remote transducer should be fed back (e.g. via the optical part of the system) to allow the optimal selection of a rough start frequency drawn from a look up table (in practice this might actually be a second start frequency, since no data on temperature can come back until some power is sent to the remote/other end/side). The operating frequency is then optimised to yield a maximum in the vicinity of the rough start second frequency using a feedback loop to sit the frequency on a local peak for signal transmission.

FIG. 3 is a plan view of the transducer 10 and transmission medium 8 of FIG. 2, but also showing additional details and items in the form of electrical connections to/from the transducer 10.

In order to apply a potential difference across the piezoelectric layer 60, it is of course necessary to supply the transducer 10 with electrical power. Conversely, there may be a need to extract an electrical signal from the transducer 10. Electrical connectors will be required to facilitate such connection. In an example embodiment, at least one of those electrical connectors is flexible in nature. More particularly, the flexible connector might have an even more specific advantageous configuration.

Referring back to FIG. 3, a flexible electrical connector 80 is shown. The flexible electrical connector 80 extends around a major portion of the periphery of the second electrode 64 to which the connector 80 is attached/electrically connected. The flexible connector 80 is attached and electrically connected to the second electrode 64 at discrete points 82 about the periphery of the second electrode 64. The discrete points 82 might take the form of a solder or other electrically connecting attachment or bond. The discrete points 82 are distributed about a substantial portion of the periphery.

The transducer 10 might work quite well if only a single point of electrical contact was made to the, for instance, the second electrode 64. However, distributing the electrical contacts 82 might provide a more distributed electrical contact to the electrode 64. This distributed electrical contact will reduce the sheet current density, especially when the electrode 64 is a thin metallisation layer or similar, typical of transducers. Reducing sheet current density might improve the overall electrical and physical operation of the transducer in terms of more uniform electrical driving and power extraction, and allow higher power operation prior to the onset of fusing of the metallisation layer due to excessive current densities.

The distributed nature of both the electrical and physical contacts 82 with the electrode 64 might also have physical benefits, for example by allowing a larger area of the transducer to be uniformly loaded during bonding with bonding tool, rather than being constrained by the presence of a simple ring shaped electrical interconnect to the second electrode 64 to loading just the first electrode 62. Another physical benefit is that flexible connections 80 between adjacent contacts 82 will reduce the impact of coefficient of thermal expansion mismatch between the interconnect material used in the construction of items 112, 80 and the lateral coefficient of thermal expansion of the piezoelectric layer 60. The flexible connections 80 in particular will reduce any compressive stress applied close to the outside perimeter of the transducer 60 resulting in physical bowing of the transducer from its ideal flat profile prior to bonding.

Any force or weight or the like that might result due to the presence of the connector 80 or the interaction between the connector 80 and the electrode 64/piezoelectric layer 60 by way of contacts 82 might also be more uniformly and evenly distributed.

Indeed, it can be seen that the flexible electrical connector 80 is provided with stress relieving geometry 84 at and/or between the contact points 82. The aim of this is to prevent stress build up at the connector 80 which might otherwise be imparted onto or into the electrode 64/piezoelectric layer 60, or to simply absorb within the connector 80 some of the forces that might otherwise be imparted onto the electrode 64/piezoelectric layer 60.

The stress relieving geometry, or a geometry that at least assists in a more uniform distribution of loads or the like on the electrode 64/piezoelectric layer 60, might be achieved in one of a number of ways. For instance, the flexible electrical connector 80 generally extends around and is spaced apart from the electrode 62, but at the discrete points 82 the flexible connector 80 extends inwardly and into contact 82 with the electrode 64. This inwardly projecting or extending geometry or shaping might assist in the stress relief and the more uniform distribution of force, for example acting in a spring-like manner or similar.

The Figure shows a quite angled geometry of the connector 80, but this geometry could be more curved or rounded to reduce points of stress of loading.

A flexible connector 86 might also be used to electrically connect the first electrode 62 to other components, for example the controller referred to above. The flexible connector 86 might have at least some of the benefits of the connector 80. This flexible connector 86 might be allowed to flex in some way, for example by being slightly slack, bendable or bent, flexible, or generally non-straight, so as to allow for some movement between the transducer 10/first electrode 62 and components connected thereto (e.g. a controller).

FIG. 4 shows another geometry that could be used in combination with, or in place of the geometry of the flexible electrical connector of FIG. 3. In FIG. 4, a different flexible electrical connector 90 is shown. The purpose and function of the electrical connector 90 might be much the same as that described in relation to FIG. 3. The geometry and properties exhibited by this particular flexible electrical connector 90 is (more) spring-like and more particularly planar spring-like. The plane of the spring is in parallel to the plane of the electrodes/piezoelectric layers of the transducer. This means that relative movement or expansion etc., between different parts of the flexible connector 90, or between the connector 90 and the electrode to which it is attached, or the electrode, can more readily and repeatedly be accommodated, as will be discussed in more detail below. The inclusion of kinematic hinges 92 (which might be described as joints or couplings), in the form of cut-outs or recesses, at or adjacent to points where moving or flexing might take place also assists mechanically isolating the electrode/piezoelectric layer from (external) stress.

The spring geometry might take any one of a number of different forms, but the planar spring geometry might be advantageous in accounting for expected expansion or relative movement in-plane. The planar spring-like geometry might comprise of a diamond or rhombus or quadrilateral or parallelogram frame-structure 94. Two corners of such an arrangement may be in connection with the parts of the connector 90 that are in contact 82 with the electrode. Other corners or vertices of the structure 94 might be readily free to move, subject to constraint by an optional linking bar, or strut, or arm 96. The overall force or spring-like properties of the structure 94, 96 will be determined by the material used for the overall construction, and the dimensions involved and also, most importantly, by the cross sectional thickness of the linking arm 96. This linking arm 96 might be particularly configured to ensure the spring has a particular stiffness.

The presence of the flexible connector described above is advantageous in, for example, minimising the stress on the electrodes to which the connector is attached, and therefore the piezoelectric layer. Stress may be imposed due to differential forces acting on one or both of the connector or the electrode, for example as a result of differential heating of the connector and the electrode/piezoelectric layer, or different coefficients of thermal expansion of the connector and the electrode. Additionally and/or alternatively, the isolation between the connector and the electrode/piezoelectric layer (i.e. general transducer structure) might have more general benefits in terms of mechanically isolating the electrode/piezoelectric from the connector and to whatever the connector is attached, which might improve transducer performance or signal generation or reception. Also or alternatively, improvements might relate to reducing stresses on the metallic films of the transducer structure. For example if the interconnect is not flexible and it heats up due to current flow, then this will stress the surface joint of the metallic films adhering to the piezoelectric layer, and potentially cause it to lose key and peel off. As well as mechanically isolating the electrode/piezoelectric from the connector, the construction might also assist in the fabrication of the transducer/system as a whole. For example, the spring-like geometry or functionality might prevent the contacts 82 from flopping about during the construction process, making it easier to attach these to the electrode in a quick and efficient manner.

The arrows in FIG. 4 depict in more detail an example of the functionality described above. Arrow 100 schematically depicts a separation between adjacent contacts 82. The piezoelectric layer of the transducer typically has a lower coefficient of thermal expansion than the flexible electrical connector 90. Heat generated during soldering/heat induced application/bonding of the contacts 92 will cause differential expansion of the piezoelectric layer and flexible connector 90, which could cause the piezoelectric layer to bow. However, the spring-like geometry and construction 94, 96 serves to avoid or at least partially reduce the bowing.

FIG. 4 shows that as the separation 100 reduces, there is differential contraction of the flexible connector 90 as indicated by arrows 102. However, as opposed to this causing a build up of significant stress in the connector 90, which might have an adverse effect on the overall transducer performance/structural integrity/configuration, the arrows 104 show that spring-like structure 94, 96 can flex in response to the contraction 102 to relieve the stress. Linking arm 92 provides the biasing or return force 105.

Mainly physical, structural benefits of the flexible electrical connector have been described above. However, physical properties of the flexible connector might be different around its circumference, as that circumference extends around the electrode, to affect electrical properties. For instance, referring back to FIG. 3, the flexible connector 80 might comprise a first portion 110 that extends around a substantial portion of the periphery of the second electrode 64, and one or more second portions 112 that extend away from the first portion 110 and which are generally arranged to take the delivery of electrical power to/from this portion 110. The first portion 110 might have a smaller cross-sectional area, or is thinner, or is narrower, further from where the second portions 112 meet the first portion 110 than at, or more adjacent to, the meeting locations. The amount of current that reaches the portion 110 further away from portions 112 receives less current. So, making the cross-sectional area or similar smaller at these locations might help ensure a more consistent and uniformed delivery of current about and around the electrode, thus improving the uniform driving of the transducer 10 as a whole.

The flexible connectors might be formed entirely from conductive material, or from conductive material located on, embedding, or embedded within, a flexible carrier, for example a flexible polymer/plastic carrier.

The use of a flexible connector as described above might be advantageous in combined use with the optical aperture. For example, preventing bowing of the transducer or piezoelectric layer therefor might prevent changes to the shape of the optical aperture. This might improve optical performance. There are also potential issues with adhesive or other bond material squeezing out into the optical aperture, as a result of the bowing, and thus blocking the aperture. So, limiting or preventing such bowing can limit or prevent such blocking. Adhesive or other bond material might be applied as small controlled dots, away from the optical aperture, to also limit or prevent such blocking. Capillary action will transport the adhesive/bond material over the entire surface that needs to be bonded, for example to transmission medium.

In an alternative and/or additional approach to addressing the potential risk of the adhesive/bond material leaking over/into the optical aperture on the end of the solid transmission medium, a small diameter disc (or shape matching the aperture) of matching optical material (e.g. at least index matched) close or identical to the transmission medium could be bonded to the end of the solid transmission medium, for example using an optical adhesive that is also index matched to the medium. This would remove the risk of adhesive/bond material obscuring the optical aperture. A pre-bonded optical disc would also allow the transducer to be gently moved slightly back and forth during the bonding process, to help the adhesive layer ooze out until it bottoms off onto the spacers (e.g. micro-pearl rods or spheres) used to control the thickness of the transducer bond. Pre-bonded discs could be used to conveniently co-align the two transducers more accurately, which might help in terms of both optical and acoustic transmission/reception.

In an operating environment subject to high levels of shock or vibration, it is likely to be important that the rod of the solid transmission medium is robustly restrained within the hole in the barrier into which the transmission medium is inserted. This can be achieved with locking clamps fixed onto the barrier at each side of the barrier, to prevent longitudinal movement of the rod of the solid transmission medium. Coupling of acoustic power into the clamps applied directly onto the surface of piezoelectric transducer can be largely suppressed by using, for example, an engineering plastic the acoustic impedance of which is very much lower than that of the transducer. Rotational movement of the overall assembly under vibration can be prevented by non-electrically conductive pins that insert into/through matching apertures in the piezoelectric layer. A high level of rotational symmetry (in terms of mass) of the overall assembly means that turning forces on the assembly will be small.

The principles and methodologies have been described in relation to FIGS. 1 to 4 in quite a specific manner. FIGS. 5 and 6 depict more generally methodology that relates to the transducer structure and operating principles described above. For instance, FIG. 5 is a flowchart showing use of the transducer described above having a flexible electrical connector 120. The use comprises generating or receiving an acoustic signal using the transducer, in order to transmit or receive data and/or power using that acoustic signal 122. FIG. 6 is a flowchart which schematically depicts a method that might be related to or used in isolation of the method of FIG. 5. The method comprises generating or receiving an acoustic signal using a transducer, in order to transmit or receive data and/or power using acoustic signal 130. The method further comprises transmitting or receiving an optical signal through an optical aperture extending through the transducer 132. As already discussed above, the acoustic and optical signals might be generated or transmitted or received in any particular order, for example the acoustic signal being generated in advance of the optical signal, at the same time as the optical signal, or after the optical signal.

Components located on one side of a barrier might be described as being associated with one another, in terms of giving those components a collective locational label, for example in comparison with components associated with an opposite side of the barrier.

The electroacoustic transducers described above have, in general, been described as part of power and/or data transceiver system. However, it will of course be apparent that the described electroacoustic transducers exhibit many of the described advantages in isolation, or independently of, this system as a whole. That is, the described electroacoustic transducers might be used in isolation in certain embodiments, or in combination with like transducers, or even retrofitted into systems comprising similar transducers to improve the performance of such systems as a whole.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An electroacoustic transducer, comprising:
 a first electrode;
 a second electrode;
 a piezoelectric material at least partially sandwiched between the first electrode and the second electrode; and
 a flexible electrical connector in electrical connection with the first or second electrode at discrete points around a periphery of that electrode, the discrete points being distributed about a substantial portion of that periphery.

2. The electroacoustic transducer of claim 1, wherein the flexible electrical connector has a stress relieving geometry at and/or between the discrete points.

3. The electroacoustic transducer of claim 1, wherein the flexible electrical connector generally extends around and is spaced apart from the first or second electrode, except at the discrete points, where the flexible connector extends inwardly toward the first or second electrode.

4. The electroacoustic transducer of claim 1, wherein the flexible electrical connector is shaped to have a spring-like, or planar spring-like, structure or geometry at and/or between the discrete points.

5. The electroacoustic transducer of claim 1, wherein the flexible electrical connector comprises one or more kinematic hinges.

6. The electroacoustic transducer of claim 1, wherein the flexible connector comprises a first portion that extends around a substantial portion of the periphery of the first or second electrode, and one or more second portions that meet and extend away from the first portion and arranged to facilitate the delivery of electrical power to/from the first portion, and wherein the first portion has a smaller cross-sectional area, or is thinner, or is narrower, further from the meeting location or locations than it is at or more adjacent to the meeting location or locations.

7. The electroacoustic transducer of claim 1, wherein the first or second electrode at least partially wraps around the piezoelectric material, such that a portion of the second electrode and the first electrode are located on a same side of the piezoelectric material.

8. The electroacoustic transducer of claim 1, further comprising an optical aperture extending through the electroacoustic transducer, to allow for optical communication to take place through the electroacoustic transducer.

9. A system, comprising a first the electroacoustic transducer of claim 1, wherein the electroacoustic transducer is utilized as a power transmitter, a data transmitter, a power receiver, or a data receiver.

10. The system of claim 9, wherein the first or second electrode of the electroacoustic transducer is bonded to a solid transmission medium, via which medium power and/or data can be transmitted and/or received by the first electroacoustic transducer.

11. The system of claim 10, wherein the electroacoustic transducer is a first electroacoustic transducer, the system further comprising a second electroacoustic transducer, the first or second electrode of each of the first and second electroacoustic transducers being bonded to substantially opposite ends or sides of the solid transmission medium, to allow for acoustic power and/or data transmission between the first and second electroacoustic transducers via the solid transmission medium.

12. The system of claim 11, comprising first and second electroacoustic controllers associated with, respectively, the first and second electroacoustic transducers, for:
controlling the first or second electroacoustic transducer to generate an acoustic signal, for transmitting power and/or data to the second or first electroacoustic transducer, via the solid transmission medium, using that signal; and/or
receiving power and/or data from the first or second electroacoustic transducer as a result of the first or second electroacoustic transducer receiving that signal.

13. The system of claim 10, comprising first and second optical controllers associated with, respectively, the first and second electroacoustic transducers, for optically transmitting/receiving data between the first and second optical controllers, the transmission/reception being through the solid transmission medium which is also substantially transparent to the transmission of optical signals, and through an optical aperture extending through each of the first and second electroacoustic transducers.

14. The system of claim 10, wherein the solid transmission medium extends through a barrier, from one side to another, and wherein the barrier is an electrical insulator and/or is optically opaque.

15. A method of transmitting or receiving data and/or power using an electroacoustic transducer, the method comprising:
generating or receiving an acoustic signal using the transducer, in order to transmit or receive data and/or power using that acoustic signal,
wherein the transducer comprises a flexible electrical connector in electrical connection with an electrode of the transducer, around a substantial portion of a periphery of that electrode, wherein the flexible electrical connector is in electrical connection with the electrode at discrete points around a substantial portion of the periphery of that electrode.

16. The method of claim 15, wherein the flexible electrical connector generally extends around and is spaced apart from the electrode, except at the discrete points, where the flexible connector extends inwardly toward the electrode.

17. The method of claim 15, wherein the flexible electrical connector comprises one or more kinematic hinges.

18. The method of claim 15, wherein the electroacoustic transducer is a first electroacoustic transducer that operates in conjunction with a second electroacoustic transducer, the method further comprising:
controlling the first electroacoustic transducer to generate the acoustic signal, for transmitting power and/or data to the second electroacoustic transducer, via a solid transmission medium, using that acoustic signal; and/or
receiving power and/or data from the second electroacoustic transducer as a result of the second electroacoustic transducer receiving that acoustic signal.

19. The system of claim 9 wherein the system is a power system.

20. The system of claim 9 wherein the system is a data communication system.

* * * * *